(12) United States Patent
Sato et al.

(10) Patent No.: US 8,982,264 B2
(45) Date of Patent: Mar. 17, 2015

(54) IMAGING APPARATUS AND IMAGE COMMUNICATION METHOD

(71) Applicant: Olympus Imaging Corp., Shibuya-ku, Tokyo (JP)

(72) Inventors: Kazuhiro Sato, Sagamihara (JP); Izumi Sakuma, Musashino (JP); Tomomi Uemura, Tokyo (JP); Osamu Nonaka, Sagamihara (JP)

(73) Assignee: Olympus Imaging Corp. (JP)

( * ) Notice: Subject to any disclaimer, the term of this patent is extended or adjusted under 35 U.S.C. 154(b) by 0 days.

(21) Appl. No.: 14/086,562

(22) Filed: Nov. 21, 2013

(65) Prior Publication Data

US 2014/0139700 A1   May 22, 2014

(30) Foreign Application Priority Data

Nov. 22, 2012   (JP) .................................. 2012-256085

(51) Int. Cl.
*H04N 5/222* (2006.01)
*H04N 5/225* (2006.01)
*H04N 5/76* (2006.01)
*H04N 5/262* (2006.01)
*H04N 5/232* (2006.01)

(52) U.S. Cl.
CPC .................................. *H04N 5/23222* (2013.01)
USPC ................ 348/333.05; 348/207.1; 348/231.3; 348/239; 348/333.11

(58) Field of Classification Search
USPC .............................. 348/207.99–207.2, 222.1, 348/231.99–231.9, 239, 333.01–333.13
See application file for complete search history.

(56) References Cited

U.S. PATENT DOCUMENTS

| | | | | |
|---|---|---|---|---|
| 7,084,909 | B2 * | 8/2006 | Yamasaki | 348/239 |
| 8,773,543 | B2 * | 7/2014 | Alakarhu et al. | 348/218.1 |
| 2002/0097327 | A1 * | 7/2002 | Yamasaki | 348/239 |
| 2006/0013507 | A1 * | 1/2006 | Kaneko et al. | 382/312 |
| 2007/0177822 | A1 * | 8/2007 | Uno | 382/305 |
| 2008/0095447 | A1 * | 4/2008 | Fukuyama et al. | 382/209 |
| 2008/0104011 | A1 * | 5/2008 | Shibasaki et al. | 707/1 |
| 2010/0092093 | A1 * | 4/2010 | Akatsuka et al. | 382/203 |
| 2012/0167126 | A1 * | 6/2012 | Paek et al. | 725/14 |
| 2012/0194636 | A1 * | 8/2012 | Tokunaga et al. | 348/36 |
| 2013/0042205 | A1 * | 2/2013 | Tsuda et al. | 715/811 |
| 2014/0189072 | A1 * | 7/2014 | Imai et al. | 709/219 |
| 2014/0198220 | A1 * | 7/2014 | Nakamura | 348/169 |
| 2014/0240454 | A1 * | 8/2014 | Hirata et al. | 348/38 |

FOREIGN PATENT DOCUMENTS

| | | |
|---|---|---|
| JP | 03-093364 | 4/1991 |
| JP | 2009-237703 | 10/2009 |

* cited by examiner

*Primary Examiner* — Michael Osinski
(74) *Attorney, Agent, or Firm* — Volpe and Koenig, P.C.

(57) ABSTRACT

An imaging apparatus includes a communication unit, a display unit, a selecting unit, an imaging unit, and a control unit. The communication unit acquires image data of a connection partner from an external apparatus of the imaging apparatus. The display unit displays an image in accordance with the acquired image data of the connection partner. The selecting unit selects, as a connection side, one of sides of the image displayed on the display unit. The imaging unit images a subject to acquire image data to be connected to the image data of the connection partner after the connection side is selected by the selecting unit. The control unit records the image data acquired by the imaging unit in a recording unit together with information indicating the position of the connection side.

6 Claims, 13 Drawing Sheets

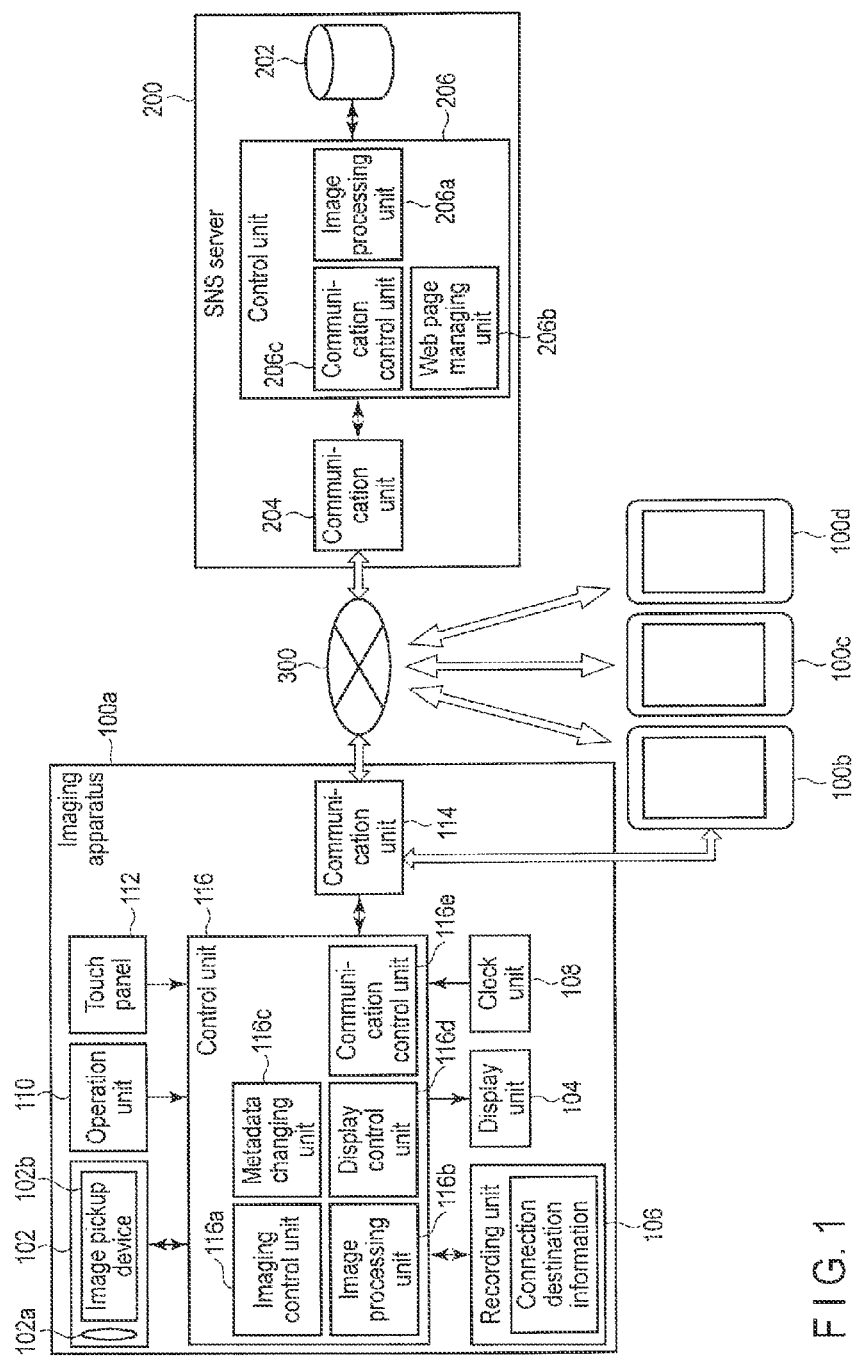
F I G. 1

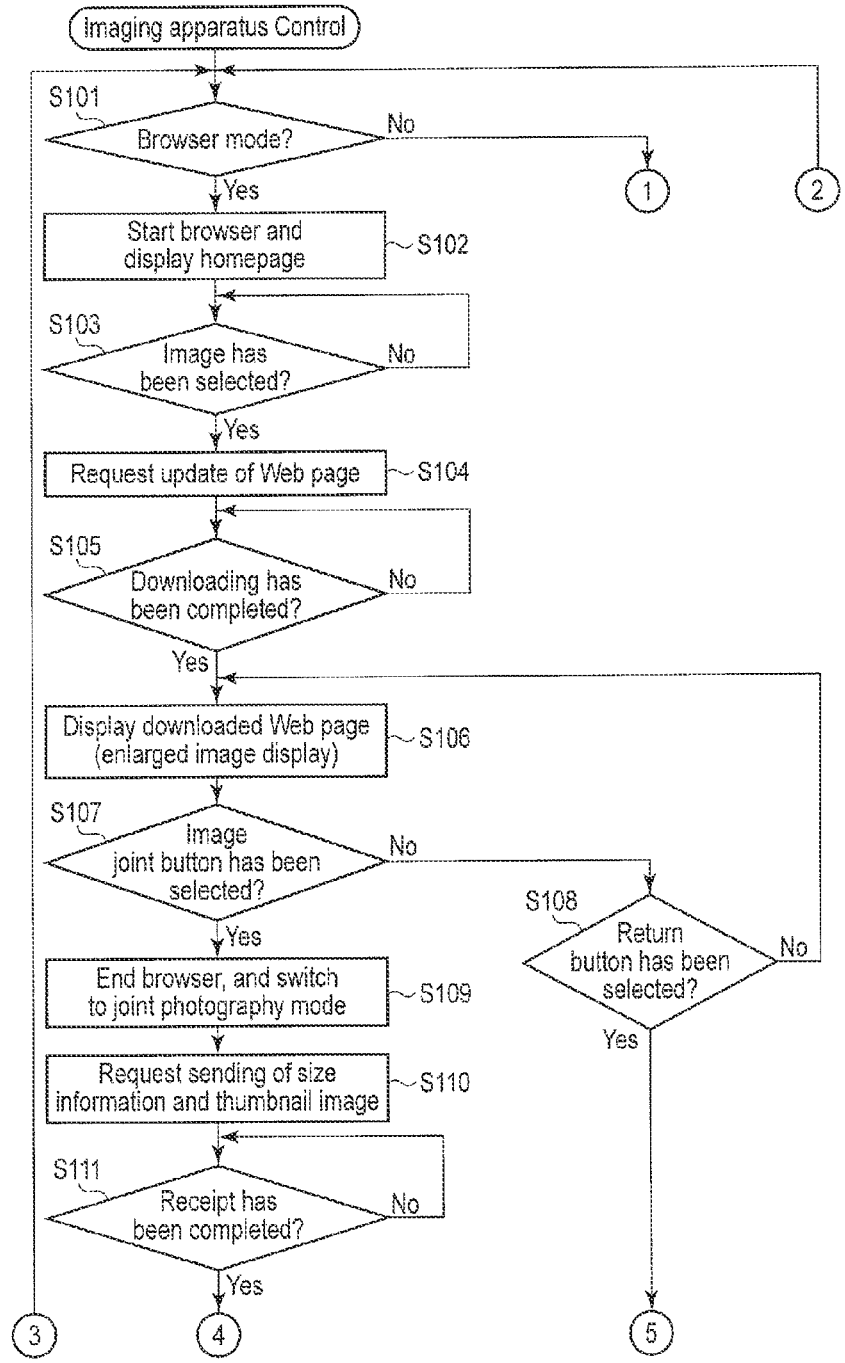
F I G. 2A

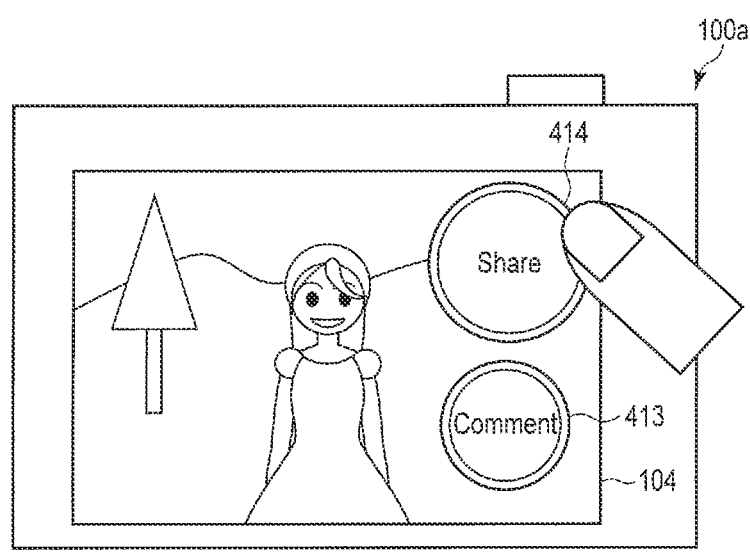
F I G. 9

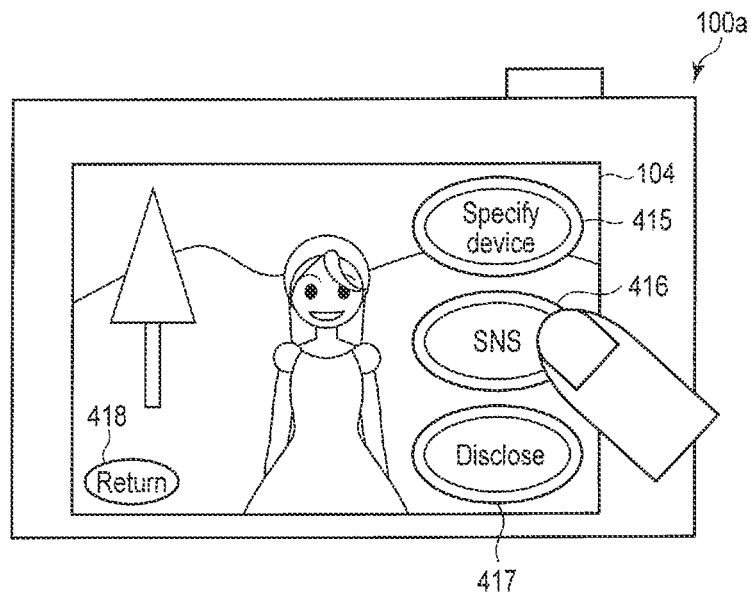
F I G. 11
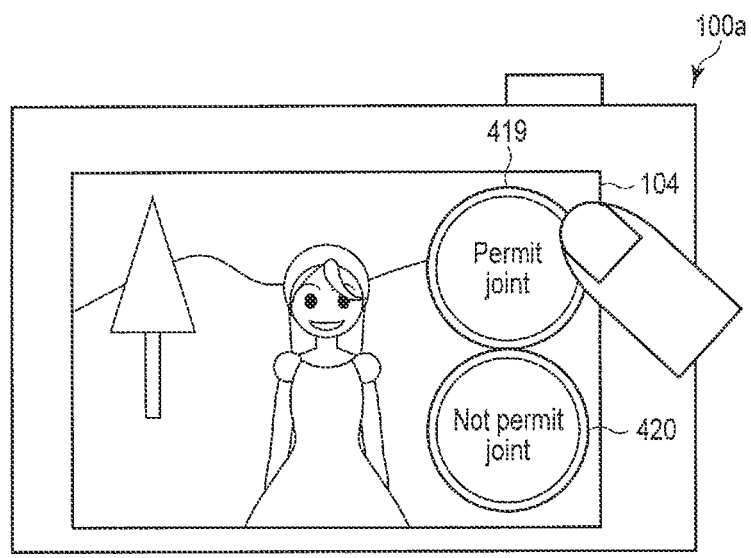
F I G. 12

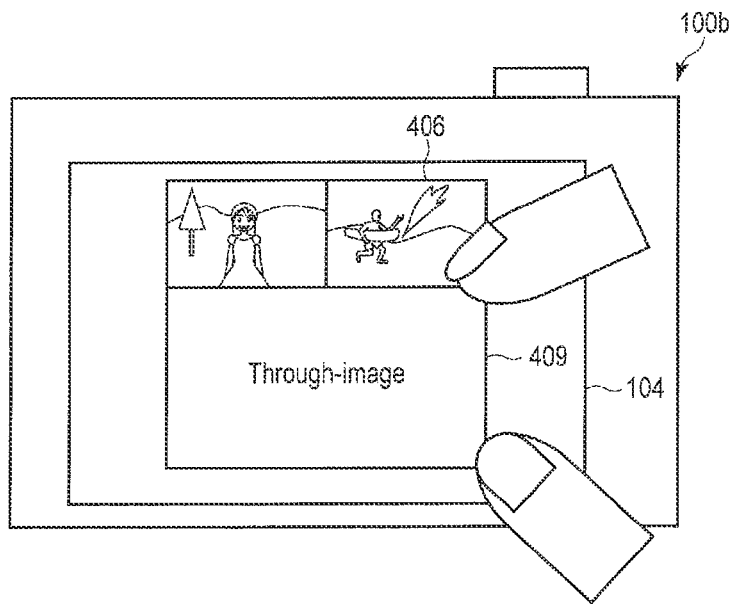
F I G. 14C
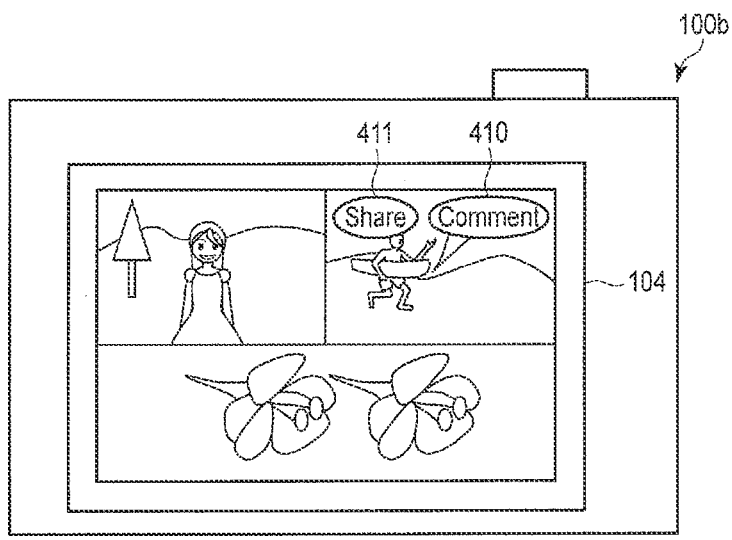
F I G. 14D they invention may be realized and obtained
IMAGING APPARATUS AND IMAGE COMMUNICATION METHOD

CROSS-REFERENCE TO RELATED APPLICATIONS

This application is based upon and claims the benefit of priority from the prior Japanese Patent Application No. 2012-256085, filed Nov. 22, 2012, the entire contents of which are incorporated herein by reference.

BACKGROUND OF THE INVENTION

1. Field of the Invention

The present invention relates to an imaging apparatus and an image communication method.

2. Description of the Related Art

Heretofore, various suggestions have been made regarding imaging apparatuses having a function to collect and edit photographic images. For example, Jpn. Pat. Appln. KOKAI Publication No. 3-93364 suggests editing, in accordance with a set time schedule, photographic data corresponding to each model image obtained by photographing a three-dimensional model from a given point of view and with a desired angle of field.

In connection with, for example, digital cameras, there has been known a technique for creating an image called a composite picture in which photographic images are combined to express a particular theme. For example, Jpn. Pat. Appln. KOKAI Publication No. 2009-237703 provides a technique that enables such a composite picture to be easily created. Images are grouped by an extraction condition input by a user, and samples of the grouped images are displayed so that images used for the composite picture can be easily searched for.

BRIEF SUMMARY OF THE INVENTION

An imaging apparatus according to a first aspect of the invention comprises: a communication unit configured to acquire image data of a connection partner from an external apparatus of the imaging apparatus; a display unit configured to display an image in accordance with the acquired image data of the connection partner; a selecting unit configured to select, as a connection side, one of sides of the image displayed on the display unit; an imaging unit configured to image a subject to acquire image data to be connected to the image data of the connection partner after the connection side is selected by the selecting unit; and a control unit configured to record the image data acquired by the imaging unit in a recording unit together with information indicating the position of the connection side.

An image communication method according to a second aspect of the invention comprises: acquiring image data of a connection partner from an external apparatus of an imaging apparatus; displaying an image on a display unit in accordance with the acquired image data of the connection partner; selecting one of sides of the image displayed on the display unit, as a connection side, by a selecting unit; imaging a subject after the connection side is selected, to acquire image data to be connected to the image data of the connection partner.

Advantages of the invention will be set forth in the description which follows, and in part will be obvious from the description, or may be learned by practice of the invention.

The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of an image communication system according to one embodiment of the present invention;

FIG. 2A is the first portion of a flowchart showing the operation of an imaging apparatus;

FIG. 9 is a diagram showing an example of image reproduction;

FIG. 11 is a diagram showing an example of a communication connection destination selection screen;

FIG. 12 is a diagram showing an example of an image joint permission selection screen;

FIG. 14A, FIG. 14B, FIG. 14C, and FIG. 14D are diagrams illustrating image joint processing by another imaging apparatus.

DETAILED DESCRIPTION OF THE INVENTION

Figure 2B:
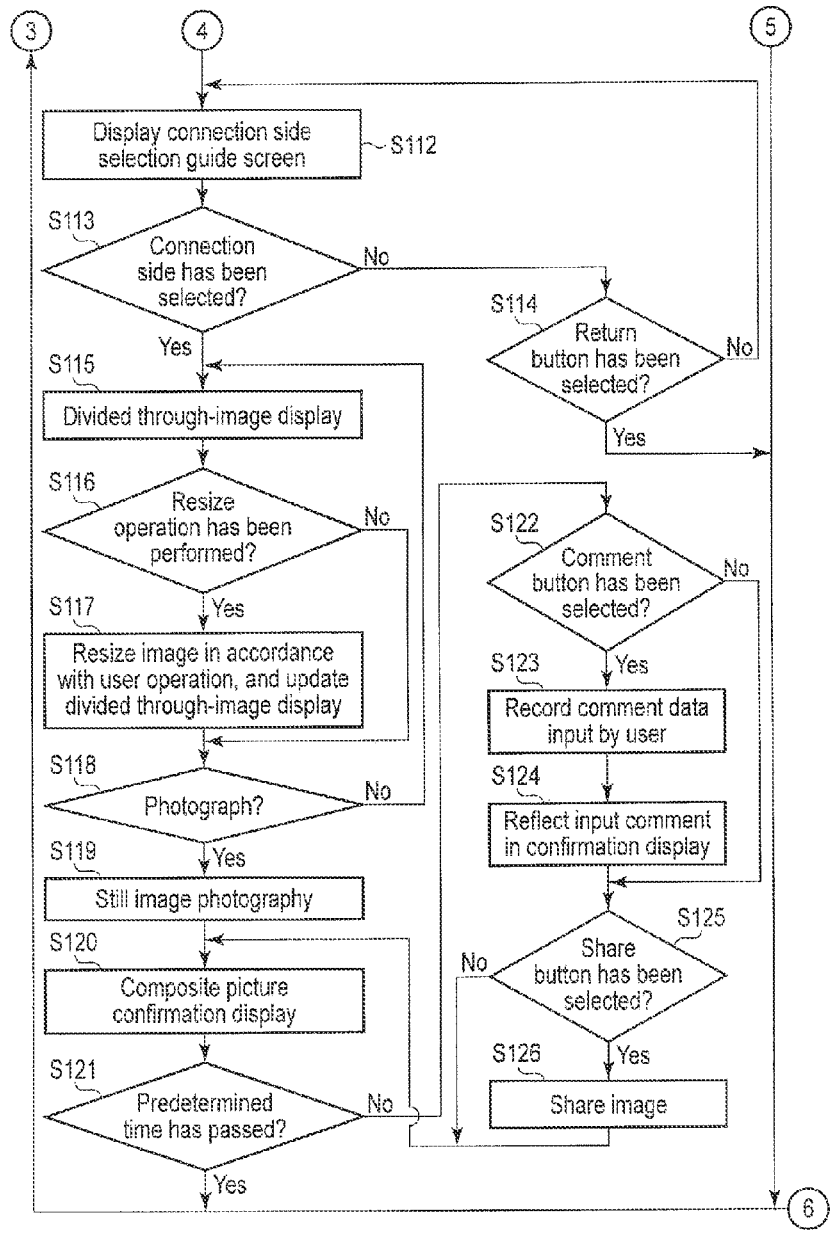
FIG. 2B is the second portion of the flowchart showing the operation of the imaging apparatus.

Hereinafter, an embodiment of the present invention will be described with reference to the drawings.

FIG. 1 is a block diagram showing the configuration of an image communication system according to one embodiment of the present invention. The image communication system shown in FIG. 1 includes imaging apparatuses 100a, 100b, 100c, and 100d, and an SNS server 200. The imaging apparatuses 100a, 100b, 100c, and 100d are connected to the SNS server 200 to be able to communicate via a network 300. The imaging apparatuses 100a, 100b, 100c, and 100d are also connected to be able to communicate with one another.

For simplicity of explanation, the configuration of the imaging apparatus 100a is described below on the assumption that the imaging apparatuses 100a to 100d have the same configuration. In actuality, however, the imaging apparatuses 100a to 100d do not need to have exactly the same configuration.

The imaging apparatus 100a is, for example, a digital camera or a smartphone, and includes an imaging unit 102, a display unit 104, a recording unit 106, a clock unit 108, an operation unit 110, a touch panel 112, a communication unit 114, and a control unit 116.

The imaging unit 102 includes a photography lens 102a and an image pickup device 102b. The photography lens 102a generates an optical image of an unshown subject, and focuses the generated optical image on the image pickup device 102b. The driving of the photography lens 102a is controlled by the control unit 116 having a function as an imaging control unit 116a. Here, the photography lens 102a may be an interchangeable lens configured to be removable from the body of the imaging apparatus 100a, or may be configured to be integral with the imaging apparatus 100a. The image pickup device 102b has a light-receiving surface in which photoelectric conversion elements as pixels are two-dimensionally arranged. Each of the pixels converts the image of the subject focused via the photography lens 102a to an electric signal (image data).

The display unit 104 displays various images such as an image based on image data processed by an image processing unit 116b of the control unit 116. The display unit 104 comprises, for example, a liquid crystal display.

The recording unit 106 records an image file generated from the image data processed by the image processing unit 116b of the control unit 116. The recording unit 106 is, for example, a flash memory incorporated in the imaging apparatus 100a. The recording unit 106 may be configured to be removable from the imaging apparatus 100a.

The clock unit 108 clocks various dates such as a photography date. The clock unit 108 may be incorporated in the control unit 116.

The operation unit 110 includes operation components for various operations of the imaging apparatus 100a performed by the user. The operation components include, for example, a release button, a moving image button, and a power switch. The release button is an operation component used by the user to instruct the imaging apparatus 100a to start still image photography. The moving image button is an operation component used by the user to instruct the imaging apparatus 100a to start and end moving image photography. The power switch is an operation component used by the user to instruct the imaging apparatus 100a to turn on or off power.

The touch panel 112 is integrally formed on a display screen of the display unit 104, and supplies the control unit 116 with information regarding a touch position of, for example, a finger of the user on the display screen. The touch panel 112 also functions as a selecting unit used by the user to select a connection side in a connection side selection guide screen described later.

The communication unit 114 is, for example, a wireless LAN interface, and serves as an intermediary when the imaging apparatus 100a communicates with the network (e.g., the Internet) 300 or the other imaging apparatuses 100b, 100c, and 100d.

The control unit 116 controls the operation of each block of the imaging apparatus 100a in accordance with the operation of, for example, the operation unit 110 or the touch panel 112. The control unit 116 has the imaging control unit 116a, and controls lens driving (e.g., focus driving and zoom driving) of the photography lens 102a of the imaging unit 102. The control unit 116 also has the image processing unit 116b, and subjects the image data to image processing. The image processing by the image processing unit 116b includes various kinds of processing such as white balance correction processing and gamma correction processing necessary when an image corresponding to the image data is displayed on the display unit 104 or recorded in the recording unit 106, and also includes, for example, compression processing and decompression processing. The image processing unit 116b also performs processing to combine multiple image data. The control unit 116 also has a metadata changing unit 116c, and changes metadata recorded in a header information portion of the image file. In the present embodiment, position information of a connection side, which is a side to connect (combine) each piece of image data for the generation of a composite picture, is recorded as the metadata. The metadata is recorded in, for example, an exchangeable image file format (Exif). The control unit 116 also has a display control unit 116d, which controls the display of an image on the display unit 104. The imaging apparatus 100a according to the present embodiment also has a browser function. The display control unit 116d also controls the start of a browser to display a Web page on the display unit 104. The control unit 116 also has a communication control unit 116e, and controls the communication that uses the communication unit 114.

The SNS server 200 as an external apparatus of the imaging apparatus 100a includes a database 202, a communication unit 204, and a control unit 206. The SNS server 200 has an image server function as well as a social networking service (SNS) server function. Here, previously registered members alone can access the SNS server 200. The registered member is identified, for example, by the collation of an ID and a password input by the user with previously registered information.

The database 202 records image files sent to the SNS server 200 from the imaging apparatuses 100a to 100d, and a composite picture image file generated by image joint processing. The database 202 also records Web page display data (HTML data).

The communication unit 204 is, for example, a wired LAN interface, and serves as an intermediary when the SNS server 200 communicates with and connects to the network (e.g., the Internet) 300.

The control unit 206 controls the operation of each block of the SNS server 200. The control unit 206 includes an image processing unit 206a, and subjects the image data to image processing. The image processing by the image processing unit 206a is processing (image joint processing) for combining multiple image data to generate the composite picture image file. The control unit 206 also includes a Web page managing unit 206b, and performs Web page management to, for example, send, to the imaging apparatus 100a, a Web page corresponding to an instruction from the imaging apparatus 100a. The control unit 206 also includes a communication control unit 206c, which controls the communication that uses the communication unit 204.

Figure 2C:
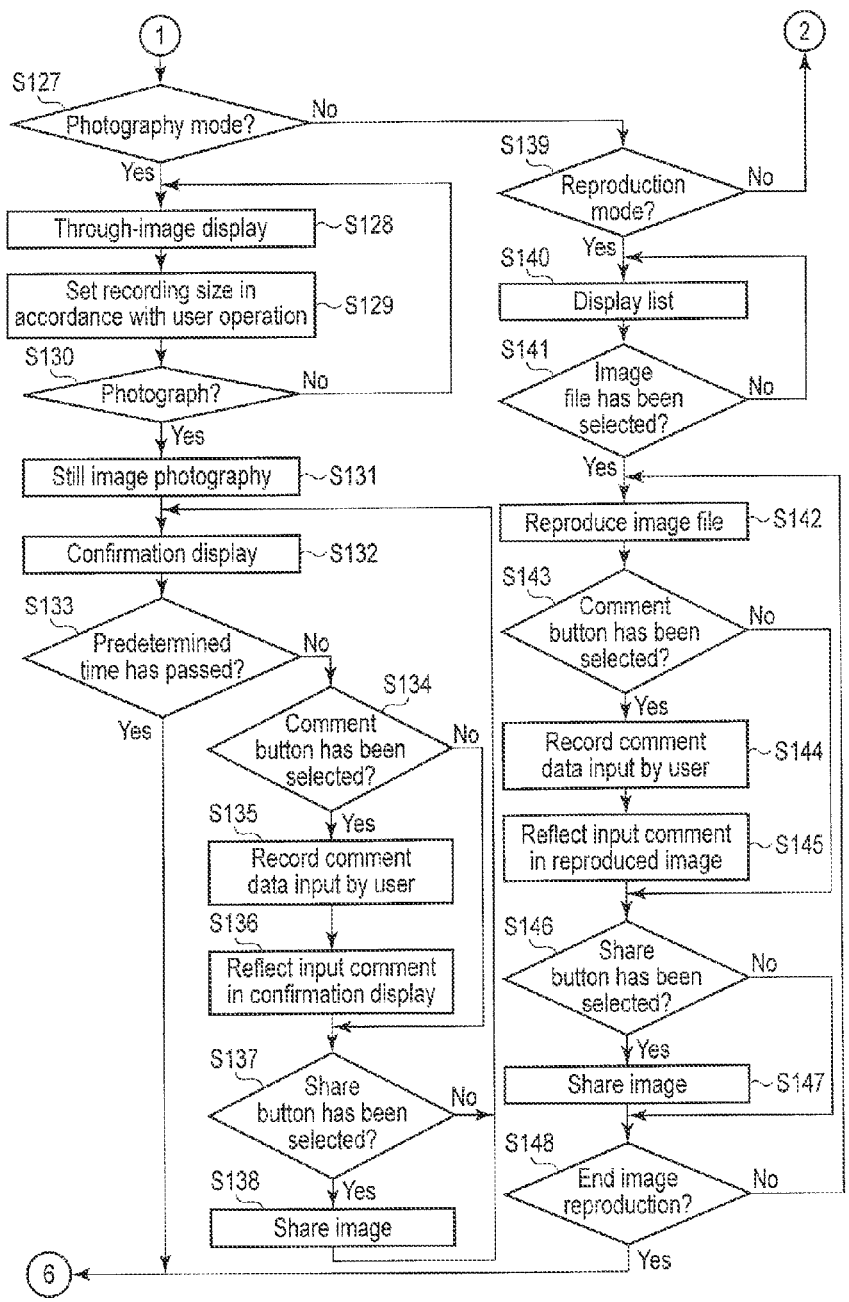
FIG. 2C is the third portion of the flowchart showing the operation of the imaging apparatus.

The operation of the image communication system according to the present embodiment is described below. First, the operation of the imaging apparatus is described. FIG. 2A, FIG. 2B, FIG. 2C are a flowchart showing the operation of the imaging apparatus 100a.

The control unit 116 determines whether an operation mode is a browser mode (step S101). The imaging apparatus 100a has at least the browser mode, a photography mode, and a reproduction mode as the operation modes. The operation mode is set in accordance with, for example, the operation of the operation unit 110 or the touch panel 112 by the user.

When the operation mode is determined to be the browser mode in step S101, the control unit 116 starts the browser. The control unit 116 receives contents from a predetermined sever to display a homepage (step S102). The following explanation continues on the assumption that the Web page of a site managed by the SNS server 200 is set as the homepage. It should be appreciated that any homepage can be set by the user. The user can also browse Web pages of other sites by inputting URLs or selecting links on the browser. This processing is a known art and its details are therefore not described.

Figure 3:
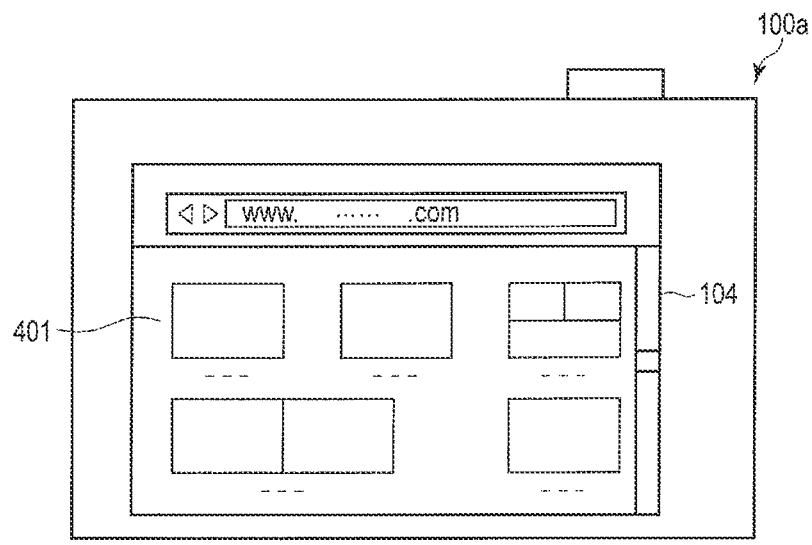
FIG. 3 shows an example of a top screen of a site managed by an SNS server.

FIG. 3 shows an example of a top screen of the site managed by the SNS server 200. In the top screen shown in FIG. 3, a list of image files recorded in the database 202 is displayed in thumbnails with titles, as indicated by the reference number 401. The user can select a desired image and thereby browse the selected image, or give an instruction for the image joint processing to connect another image to the selected image. It is also possible to browse, in this side, a composite picture image generated after the image joint processing.

The control unit 116 then determines whether an image has been selected by the user (step S103). The control unit 116 puts the processing on standby until determining in step S103 that an image has been selected.

When determining in step S103 that an image has been selected, the control unit 116 requests the SNS server 200 to update the Web page (step S104). The control unit 116 then determines whether the downloading of the Web page has been completed (step S105). The control unit 116 waits until determining that the downloading of the Web page has been completed. When the downloading of the Web page has not been completed within a predetermined time, an error warning may be given.

Figure 4:
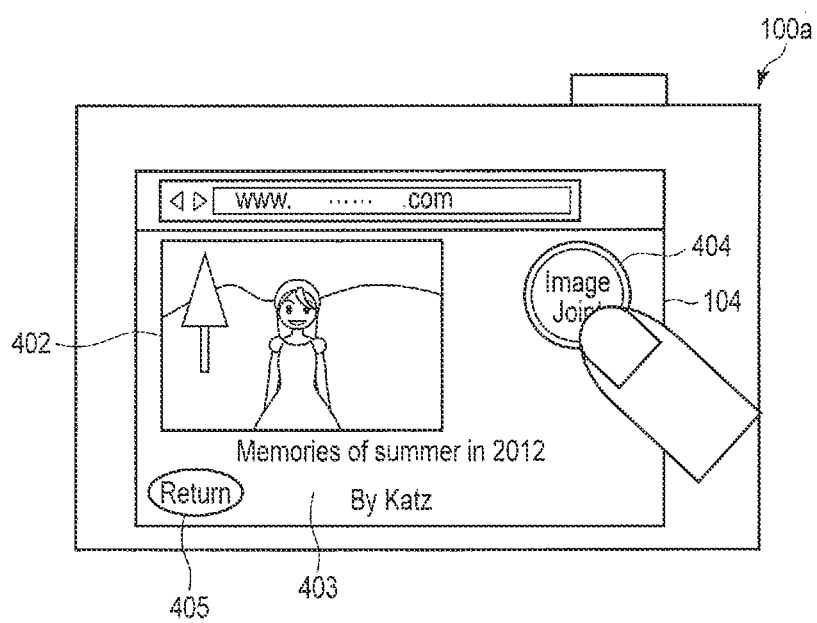
FIG. 4 is a diagram showing an example of a screen displayed on a display unit after the selection of an image.

When determining in step S105 that the downloading of the Web page has been completed, the control unit 116 displays the downloaded Web page (step S106). FIG. 4 is a diagram showing an example of a screen displayed on the display unit 104 after the selection of the image. As shown in FIG. 4, when the user has selected an image, a selected image 402 is displayed in a magnified form. A title 403 of the image 402 is also displayed. An image joint button 404 and a return button 405 are also displayed. The image joint button 404 and the return button 405 are software buttons selectable in the touch panel 112.

After the Web page corresponding to the selected image as in FIG. 4 is displayed, the control unit 116 determines whether the image joint button 404 has been selected by the user (step S107). When determining in step S107 that the image joint button 404 has not been selected, the control unit 116 determines whether the return button 405 has been selected by the user (step S108). When determining in step S108 that the return button 405 has not been selected by the user, the control unit 116 returns the processing to step S106. In this case, the magnified display of the selected image is continued. When determining in step S108 that the return button 405 has not been selected by the user, the control unit 116 returns the processing to step S101.

When determining in step S107 that the image joint button 404 has been selected, the control unit 116 ends the browser, and switches the operation mode to a joint photography mode (step S109). The control unit 116 then requests the SNS server 200 to send size information for joint photography and thumbnail image data (connection partner image data), as an instruction to perform the image joint processing (step S110). Although the sending of the thumbnail image is requested here, the sending of the selected image file may be requested. The size information here is used for the adjustment of image quality during image combination. Image quality deterioration may be permitted. When images are not combined into a belt shape, size information for image combination with a uniform width may be acquired. Images do not always need to be combined with the same width. In this case, images different in width may be arranged to produce such an effect that the images show a rhythmical impression when seen. There may be spaces between images. The spaces may change. In this case as well, size information (e.g., the number of pixels constituting the width and height of a side), if any, can be used for further arrangement refinement. Without this information, discretionary image combination is also possible.

The control unit 116 determines whether the receipt of the size information and the thumbnail image data for the image joint has been completed (step S111). The control unit 116 then waits until determining that the receipt of the size information and the thumbnail image data has been completed. Here, the size information is information indicating the size of image data that can be uploaded onto the SNS server 200, and is information preset in the SNS server 200. The thumbnail image is thumbnail image data of the image selected in step S103. When the reception has not been completed within the predetermined time, an error warning may be given. When the sending of the size information and the thumbnail images has not been permitted in the SNS server 200, an error warning may also be given.

Figure 5:
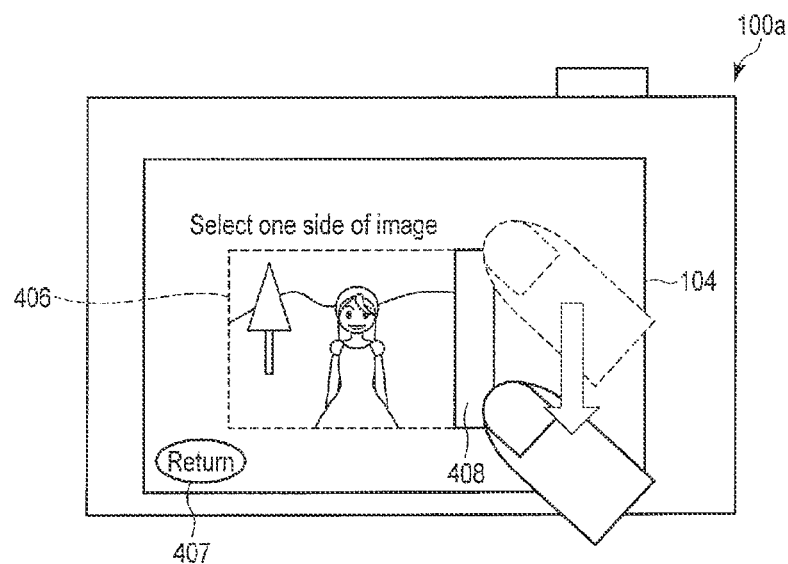
FIG. 5 is a diagram showing an example of a connection side selection guide screen.

When determining in step S111 that the receipt of the size information and the thumbnail images has been completed, the control unit 116 displays the connection side selection guide screen (step S112). FIG. 5 is a diagram showing an example of the connection side selection guide screen. As shown in FIG. 5, a downloaded thumbnail image 406 is displayed in the connection side selection guide screen. In this case, four sides of the thumbnail image 406 to be a candidate for a connection side are, for example, blinking, and the positions of the connection side candidates are guided to the user. As shown in FIG. 5, a return button 407 is also displayed in the connection side selection guide screen.

After the display of the connection side selection guide screen, the control unit 116 determines whether a connection side has been selected by the user (step S113). As shown in FIG. 5, the user slides a finger to trace a side which is to be a connection side among the four sides of the thumbnail image 406 displayed on the display unit 104. When such an operation is detected by the touch panel 112, it is determined that a connection side has been selected. Here, when a connection side has been selected, the selected side may be displayed in an enhanced state, for example, as indicated by the reference number 408. This selection of the connection side can be further refined as information for the connection of images. Not only the position of the side to be connected but also part of the side may be specified, and a wider image may be connected along this side. This can be decided by a slide range in the touch panel. Images do not need to be strictly connected, and may be connected with a particular blank. Such a blank may be selected. The touched position may be away to give a blank.

When determining in step S113 that a connection side has not been selected by the user, the control unit 116 determines whether the return button 407 has been selected by the user (step S114). When determining in step S114 that the return button 407 has not been selected by the user, the control unit 116 returns the processing to step S112. In this case, the display of the connection side selection guide screen is continued. When determining in step S114 that the return button 407 is selected by the user, the control unit 116 returns the processing to step S101.

Figure 6:
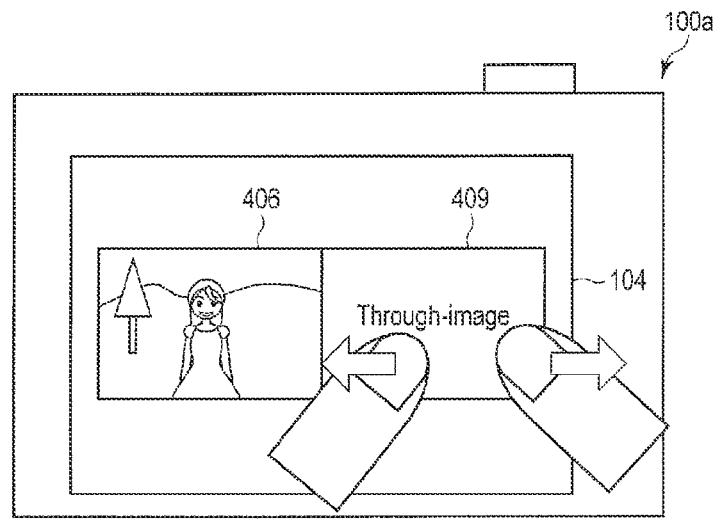
FIG. 6 is a diagram showing an example of a divided through-image display.

When determining in step S114 that a connection side has been selected, the control unit 116 performs a divided through-image display (step S115). As shown in FIG. 6, the divided through-image display is processing to display a divided through-image configured by the combination of a through-image 409 and the thumbnail image 406. For this divided through-image display, the control unit 116 starts the imaging unit 102 to acquire image data for the through-image display. The image processing unit 116*b* of the control unit 116 then performs image processing for a general through-image display such as white balance correction and gamma correction. After the image processing for the through-image display, the image processing unit 116*b* generates image data for the divided through-image display combined so that data of the through-image 409 is located at the position (the position of the right side in the example of FIG. 5) of the connection side selected in step S113 in the data of the thumbnail image 406. The image data for the divided through-image display is preferably rectangular image data. The thumbnail image 406 and the through-image 409 may not make a rectangular form when arranged side by side depending on the difference of size therebetween. In this case, the blank is preferably, for example, "transparent" image data so that the whole image is rectangular. After the generation of the image data for the divided through-image display, the control unit 116 causes the display unit 104 to perform the through-image display in accordance with the image data for the divided through-image display obtained by the image processing unit 116*b*. The divided through-image display shown in FIG. 6 allows the user to have an overview of the composite picture image generated by the image joint processing in the SNS server 200 described later.

Here, the through-image display is designed to display moving images in accordance with the image data obtained by the repeated operation of the imaging unit 102. Therefore, during the divided through-image display, data of the thumbnail image 406 is combined with the image data of each frame of the through-image 409.

After the divided through-image display, the control unit 116 determines whether a resize operation has been performed by the user (step S116). The user can use the touch panel 112 to instruct to resize the thumbnail image 406 or the through-image 409 which is displayed as the divided through-image as shown in FIG. 6. For example, a pinch operation (operation to spread or narrow the space between fingers) by the user is the resize operation. When determining in step S116 that the resize operation has not been performed by the user, the control unit 116 shifts the processing to step S118. The upper limit of the magnification size is a size indicated by the size information received in step S111. The size of the image during connection may be changed by such an operation, or a margin may be provided by a similar operation.

When determining in step S116 that the resize operation has been performed by the user, the control unit 116 resizes the thumbnail image 406 or the through-image 409. The control unit 116 then uses the image data for the divided through-image display after the resizing to update the display of the display unit 104 (step S117).

The control unit 116 then determines whether to perform photography (step S118). In step S118, the control unit 116 determines to perform photography when the release button of the operation unit 110 is pressed by the user. When determining in step S118 that photography is not performed, the control unit 116 returns the processing to step S115. In this case, the divided through-image display is repeated. When determining in step S118 that photography is performed, the control unit 116 performs still image photography as the joint photography (step S119).

In this still image photography, the control unit 116 performs AF control to focus the photography lens 102*a*, and also performs AE control to decide an exposure condition for the still image photography. The control unit 116 then causes the image pickup device 102*b* to perform a photography operation for still image recording in accordance with the exposure condition decided by the AE control.

After the photography operation for still image recording, the image processing unit 116*b* subjects the image data obtained as a result of the photography operation in the image pickup device 102*b* to general image processing for still image recording such as the white balance correction, the gamma correction, resize processing, and still image compression processing.

After the image processing for still image recording, the control unit 116 creates a still image file in accordance with the compressed image data, and records the created still image file in the recording unit 106. Here, various photography conditions such as a photography date, a recording size of the image data, and an exposure condition are recorded in a header information portion of the still image file as metadata. Moreover, in the present embodiment, information for the identification of the image data regarding the connection partner (e.g., the file name of an image file used to generate the thumbnail image 406) and information indicating the position of the connection side are also recorded as metadata. These metadata are recorded as, for example, tag information in the form of the Exif. In the present embodiment, a thumbnail image is also recorded in an image file.

Figure 7:
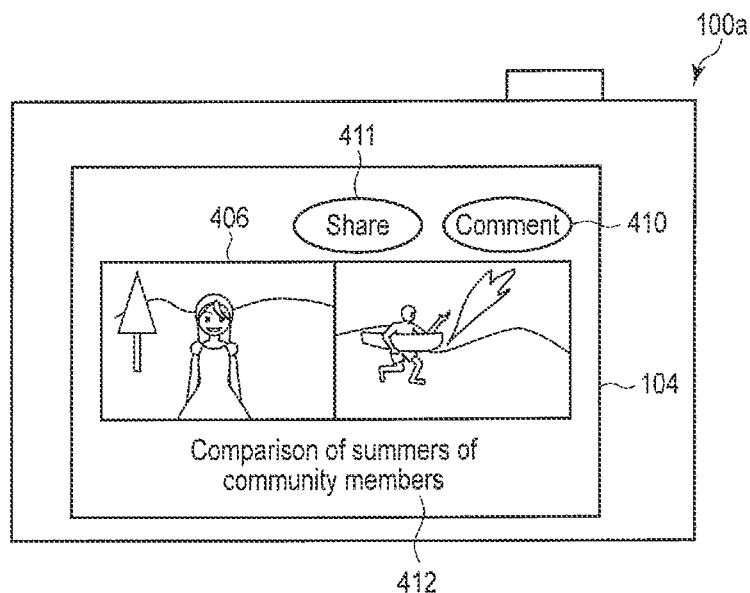
FIG. 7 is a diagram showing an example of a composite picture confirmation display.

After the still image photography, the control unit 116 performs a composite picture confirmation display (step S120). In the composite picture confirmation display, the control unit 116 generates composite picture image data which is combined so that the thumbnail image data received in step S111 is located at the position of the connection side of the image data obtained in step S119. The control unit 116 reproduces the composite picture image data on the display unit 104 as shown in FIG. 7. In the composite picture confirmation display, a comment button 410 and a share button 411 are also displayed as shown in FIG. 7. The comment button 410 and the share button 411 are software buttons operable in the touch panel 112. This composite picture confirmation display allows the user to confirm the composite picture image generated in the SNS server 200.

In the example described above, the thumbnail images are combined to generate the composite picture image for confirmation display. In contrast, the image file selected by the user may be downloaded from the SNS server 200, and image data in the downloaded image file may be combined with image data obtained by photography to generate the composite picture image for confirmation display.

After the composite picture confirmation display, the control unit 116 determines whether a predetermined time (e.g., about ten seconds) has passed (step S121). When determining in step S121 that the predetermined time has passed, the control unit 116 returns the processing to step S101.

When determining in step S121 that the predetermined time has not passed, the control unit 116 determines whether the comment button 410 has been selected by the user (step S122). When determining in step S122 that the comment button 410 has not been selected, the control unit 116 shifts the processing to step S125. When determining in step S122 that the comment button 410 has been selected, the control unit 116 displays a comment input screen. The control unit 116 then records comment data input by the user in the image file (step S123). The control unit 116 then displays a comment 412 input by the user on the display unit 104 to update the confirmation display as shown in FIG. 7 (step S124). The control unit 116 then shifts the processing to step S125.

The control unit 116 then determines whether the share button 411 has been selected by the user (step S125). When determining in step S125 that the share button 411 has not been selected, the control unit 116 shifts the processing to step S120. When determining in step S125 that the share button 411 has been selected, the control unit 116 performs image sharing processing (step S126). After the image sharing processing, the control unit 116 shifts the processing to step S120. The image sharing processing is processing in which the image file being reproduced is sent to a predetermined communication connection destination so that this image file can be shared by more than one person. The image sharing processing will be described later in detail.

Figure 8:
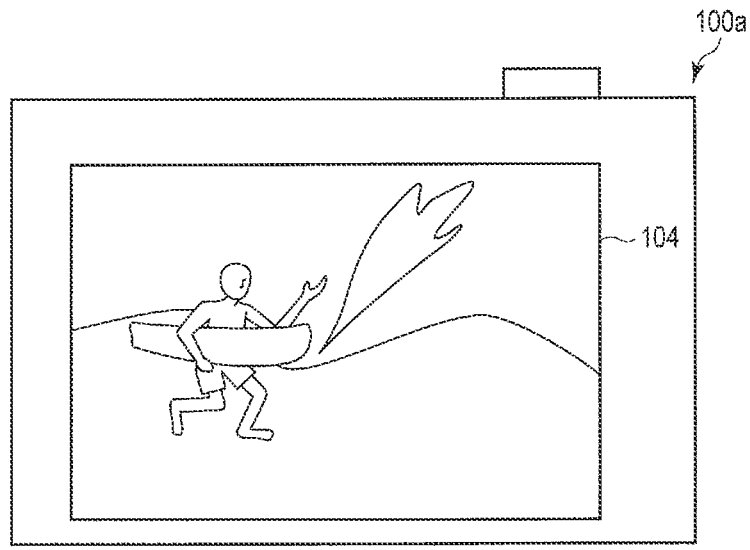
FIG. 8 is a diagram showing an example of a normal through-image display.

When determining in step S101 that the operation mode is not the browser mode, the control unit 116 determines whether the operation mode is the photography mode (step S127). When determining in step S127 that the operation mode is the photography mode, the control unit 116 performs control for the general through-image display (step S128). The processing for the through-image display in step S128 is different from that in step S115 in that display is only preformed in accordance with the image data obtained by the image processing for the through-image display shown in step S115. That is, in step S128, a through-image is displayed in the whole screen of the display unit 104, as shown in FIG. 8.

After the through-image display, the control unit 116 sets a recording size in accordance with the user operation (step S129). To instruct to set the recording size, the user, for example, operates the touch panel 112 on a menu screen displayed on the display unit 104. In contrast to the joint photography mode, the user can set the recording size in the photography mode.

The control unit 116 then determines whether to perform photography (step S130). In step S130, the control unit 116 determines to perform photography when the release button of the operation unit 110 is pressed by the user. When determining in step S130 that photography is not performed, the control unit 116 returns the processing to step S128. In this case, the through-image display is continued. When determining in step S130 that photography is performed, the control unit 116 performs still image photography (step S131). The still image photography in step S131 is basically the same processing as the still image photography described in step S119. However, in contrast to step S119, it is not necessary in step S131 to record the information for the identification of the image data regarding the connection partner and the information indicating the position of the connection side.

After the still image photography, the control unit 116 performs a confirmation display (step S132). In this confirmation display, the control unit 116 reproduces the image data obtained in step S131 on the display unit 104. In the confirmation display, a comment button and a share button that are similar to those in the composite image confirmation display are also displayed.

After the confirmation display, the control unit 116 determines whether a predetermined time (e.g., about ten seconds) has passed (step S133). When determining in step S133 that the predetermined time has passed, the control unit 116 returns the processing to step S101.

When determining in step S133 that the predetermined time has not passed, the control unit 116 determines whether the comment button has been selected by the user (step S134). When determining in step S134 that the comment button has not been selected, the control unit 116 shifts the processing to step S137. When determining in step S134 that the comment button has been selected, the control unit 116 displays the comment input screen. The control unit 116 then records the comment data input by the user in the image file (step S135). The control unit 116 then displays the comment input by the user on the display unit 104 to update the confirmation display (step S136). The control unit 116 then shifts the processing to step S137.

The control unit 116 then determines whether the share button has been selected by the user (step S137). When determining in step S137 that the share button has not been selected, the control unit 116 returns the processing to step S132. When determining in step S137 that the share button has been selected, the control unit 116 executes the image sharing processing (step S138). The control unit 116 then returns the processing to step S132. The image sharing processing will be described later in detail.

When determining in step S101 that the operation mode is not the photography mode, the control unit 116 determines whether the operation mode is the reproduction mode (step S139). When determining in step S139 that the operation mode is not the reproduction mode, the control unit 116 returns the processing to step S101.

When determining in step S139 that the operation mode is the reproduction mode, the control unit 116 displays a list of image files recorded in the recording unit 106 on the display unit 104 (step S140). The control unit 116 then determines whether the image file has been selected by the user (step S141). When determining in step S141 that the image file has not been selected, the control unit 116 returns the processing to step S140. In this case, the list display is continued.

When determining in step S139 that the image file has been selected, the control unit 116 reproduces the image file selected by the user (step S142). In the reproduction processing, the control unit 116 reads the image file selected by the user from the recording unit 106, and inputs the read image file into the image processing unit 116*b*. The image processing unit 116*b* decompresses the input compressed image data. The control unit 116 inputs the decompressed image data into the display unit 104 to display the image. Moreover, during the reproduction of the image file, a comment button 413 and a share button 414 are also displayed as shown in FIG. 9.

After the reproduction of the image file, the control unit 116 determines whether the comment button 413 has been selected by the user (step S143). When determining in step S143 that the comment button 413 has not been selected, the control unit 116 shifts the processing to step S146. When determining in step S143 that the comment button 413 has been selected, the control unit 116 displays the comment input screen. The control unit 116 then records the comment data input by the user in the image file (step S144). The control unit 116 then displays the comment input by the user on the display unit 104 to update the display (step S145). The control unit 116 then shifts the processing to step S146.

The control unit 116 then determines whether the share button 414 has been selected by the user (step S146). When determining in step S146 that the share button 414 has not been selected, the control unit 116 shifts the processing to step S148. When determining in step S146 that the share button 414 has been selected, the control unit 116 executes the image sharing processing (step S147). The control unit 116 then shifts the processing to step S148. The image sharing processing will be described later in detail.

The control unit 116 then determines whether the end of the reproduction of the image file is instructed (step S148). When determining in step S148 that the reproduction end of the image file is not instructed, the control unit 116 returns the processing to step S142. In this case, the reproduction of the image file is continued. Moreover, when determining in step S148 that the reproduction end of the image file is instructed, the control unit 116 returns the processing to step S101.

Figure 10:
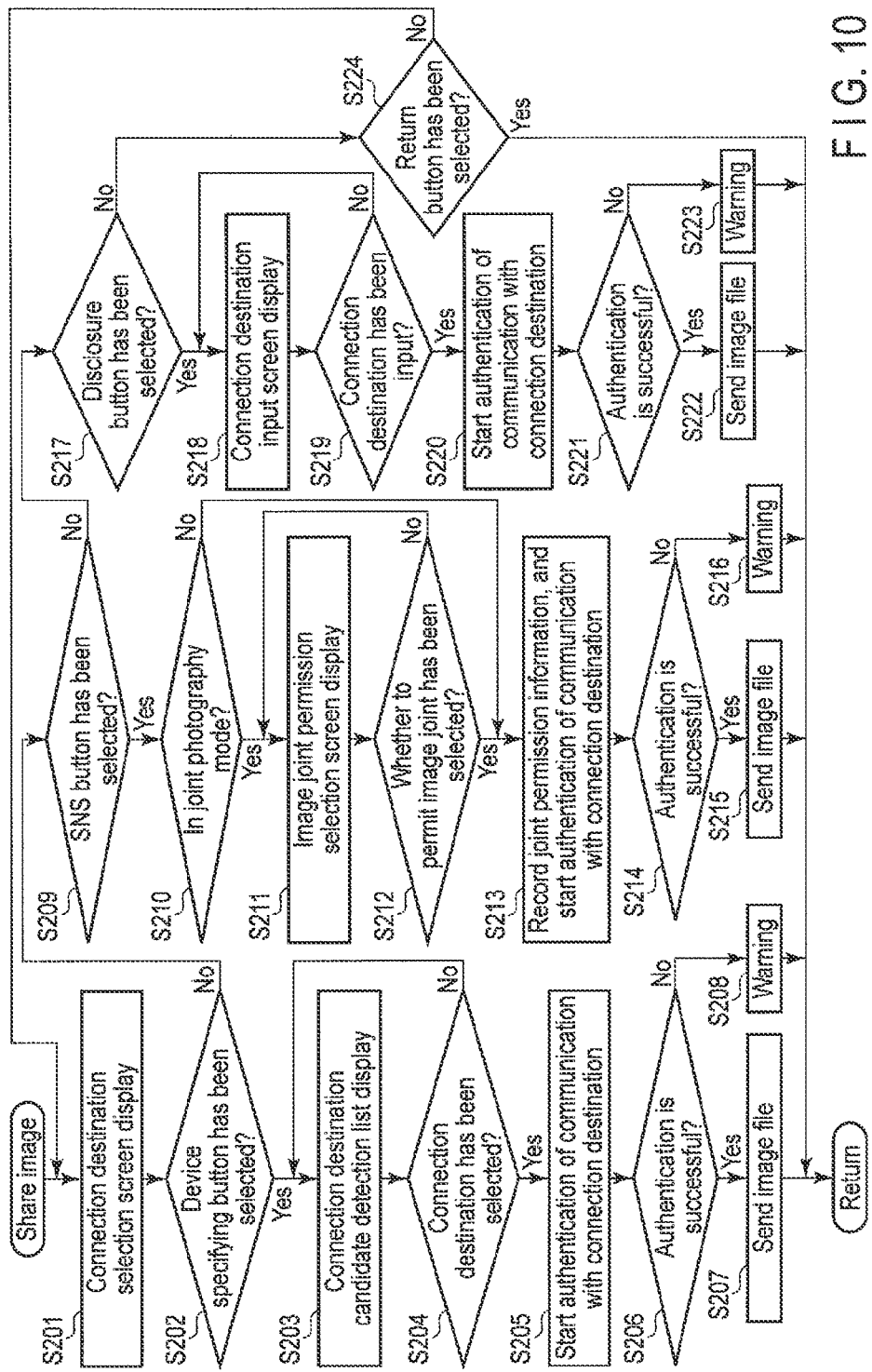
FIG. 10 is a flowchart showing image sharing processing.

FIG. 10 is a flowchart showing the image sharing processing. During the image sharing, the control unit 116 displays such a connection destination selection screen as shown in FIG. 11 on the display unit 104 (step S201). In the connection destination selection screen of the example of FIG. 11, as buttons indicating communication connection destinations, a device specifying button 415, an SNS button 416 and a disclose button 417 are displayed. The device specifying button 415 is selected by the user when the communication connection destination of the imaging apparatus 100a is a device which can communicate by direct communication via no network. The SNS button 416 is selected by the user when the communication connection destination of the imaging apparatus 100a is the SNS server 200. The disclose button 417 is selected by the user when the communication connection destination of the imaging apparatus 100a is a predetermined site which can communicate via the network 300. Furthermore, in the connection destination selection screen of the example of FIG. 11, a return button 418 is also displayed.

After the display of the connection destination selection screen, the control unit 116 determines whether the device specifying button 415 has been selected by the user (step S202). When determining in step S202 that the device specifying button 415 has been selected, the control unit 116 starts the communication unit 114, and detects, from an output of the communication unit 114, a device as a candidate of the communication connection destination communicateable via the communication unit 114. The control unit 116 displays a list of communication connection destination candidate device names on the display unit 104 (step S203).

The control unit 116 then determines whether the communication connection destination has been selected in accordance with the operation of the touch panel 112 by the user (step S204). In step S204, the control unit 116 returns the processing to step S203 until determining that the communication connection destination has been selected. When determining in step S204 that the communication connection destination has been selected, the control unit 116 performs communication authentication processing to establish the communication with the communication connection destination selected by the user (step S205). In this case, the control unit 116 urges the user to input an ID and a password, if necessary.

The control unit 116 then determines whether the communication authentication is successful (step S206). When determining in step S206 that the communication authentication is successful, the control unit 116 sends the image file to the communication connection destination via the communication unit 114 (step S207). The control unit 116 then ends the processing of FIG. 10. When the control unit 116 determines in step S206 that the communication authentication fails, for example, in a case where the authentication of the password fails, a case where the communication cannot be established, or the like, the control unit gives a warning of this failure to the user by the display unit 104 (step S208). The control unit 116 then ends the processing of FIG. 10.

When determining in step S202 that the device specifying button 415 has not been selected, the control unit 116 determines whether the SNS button 416 has been selected (step S209). When determining in step S209 that the SNS button 416 has been selected, the control unit 116 determines whether the present image sharing processing is in the joint photography mode (step S210). When determining in step S210 that the present image sharing processing is in the joint photography mode, the control unit 116 shifts the processing to step S213. The joint photography mode is a state where an image to be sent after this is to be connected to another image, and in this case, confirmation processing of step S211 and step S212 is omitted. The confirmation processing of steps S211 and S212 is processing for the image file of the image regarding the connection partner.

When determining in step S210 that the present image sharing processing is not in the joint photography mode, the control unit 116 displays such an image joint permission selection screen as shown in FIG. 12 on the display unit 104 (step S211). In the image joint permission selection screen of the example of FIG. 12, a joint permission button 419 and a joint non-permission button 420 are displayed.

The control unit 116 then determines whether the permission or the non-permission of the image joint has been selected in accordance with the operation of the touch panel 112 by the user, i.e., whether one of the joint permission button 419 and the joint non-permission button 420 has been selected (step S212). When determining in step S212 that the permission or the non-permission of the image joint processing has been selected, the control unit 116 records information of the permission or the non-permission of the image joint processing in the header information portion of the image file. That is, the control unit 116 records information indicating the permission of the image joint processing when determining that the joint permission button 419 has been selected, and the control unit 116 records information indicating the non-permission of the image joint processing when determining that the joint non-permission button 420 has been selected. After recording the information of the permission or the non-permission of the image joint processing, the control unit 116 performs processing of communication authentication to establish the communication with the SNS server 200 (step S213). In this case, the control unit 116 urges the user to input the ID and the password, if necessary.

The control unit 116 then determines whether the communication authentication is successful (step S214). When determining in step S214 that the communication authentication is successful, the control unit 116 sends the image file to the SNS server 200 via the communication unit 114 (step S215). The control unit 116 then ends the processing of FIG. 10. When the control unit 116 determines in step S214 that the communication authentication fails, for example, in a case where the authentication of the password fails, a case where the communication cannot be established, or the like, the control unit gives a warning of this failure to the user by the display unit 104 (step S216). The control unit 116 then ends the processing of FIG. 10.

When determining in step S209 that the SNS button 416 has not been selected, the control unit 116 determines whether the disclose button 417 has been selected (step S217). When determining in step S217 that the disclose button 417 has been selected, the control unit 116 displays, on the display unit 104, a communication connection destination input screen for allowing the user to input information for specifying the communication connection destination (e.g., a URL of the communication connection destination) (step S218).

The control unit 116 then determines whether the communication connection destination has been input in accordance with the operation of the touch panel 112 by the user (step S219). In step S219, the control unit 116 returns the processing to step S218 until determining that the communication connection destination has been selected. When determining in step S219 that the communication connection destination has been input, the control unit 116 performs the communication authentication processing to establish the communication with the communication connection destination input by the user (step S220). In this case, the control unit 116 urges the user to input the ID and the password, if necessary.

The control unit 116 then determines whether the communication authentication is successful (step S221). When determining in step S221 that the communication authentication is successful, the control unit 116 sends the image file to the communication connection destination via the communication unit 114 (step S222). The control unit 116 then ends the processing of FIG. 10. When the control unit 116 determines in step S221 that the communication authentication fails, for example, in a case where the authentication of the password fails, a case where the communication cannot be established, or the like, the control unit gives a warning of this failure to the user, for example, by the display unit 104 (step S223). The control unit 116 then ends the processing of FIG. 10.

When determining in step S217 that the disclose button 417 has not been selected, the control unit 116 determines whether the return button 418 has been selected (step S224). When determining in step S224 that the return button 418 has not been selected, the control unit 116 returns the processing to step S201. When determining in step S224 that the return button 418 has been selected, the control unit 116 ends the processing of FIG. 10.

Figure 13:
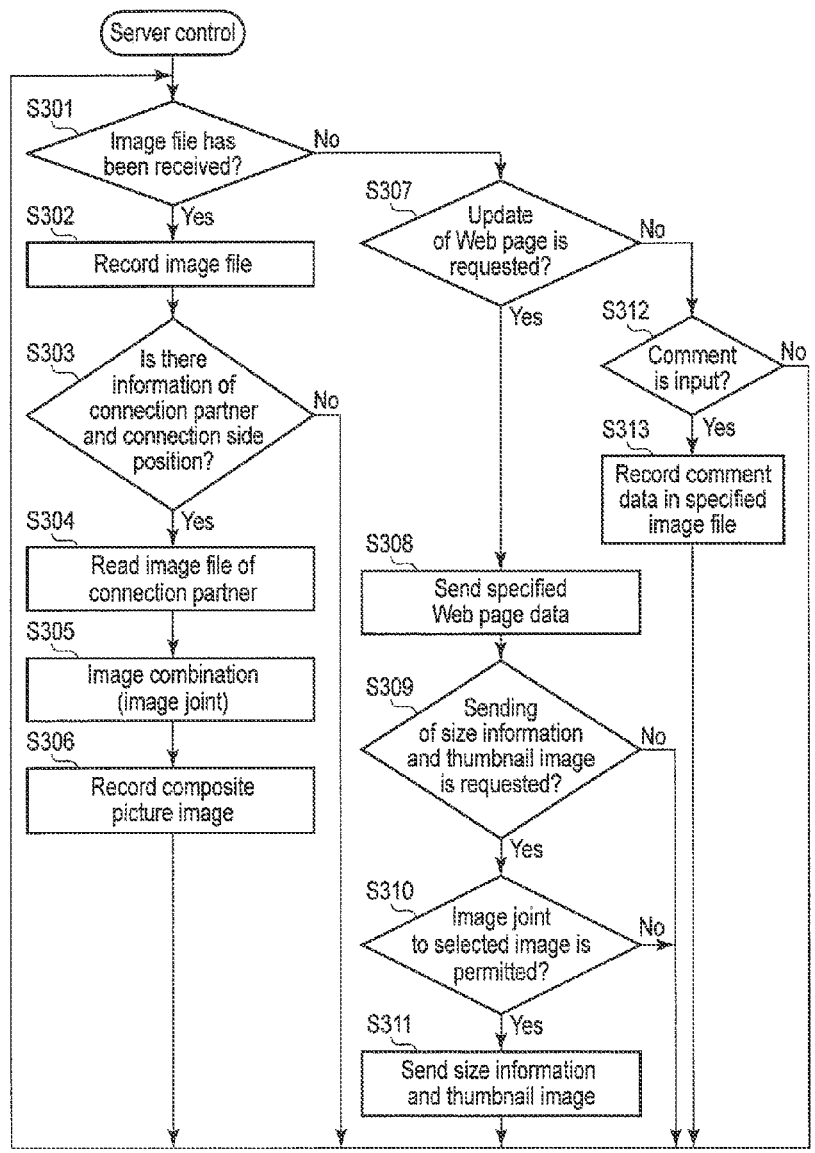
FIG. 13 is a flowchart showing the operation of the SNS server.

FIG. 13 is a flowchart showing the operation of the SNS server 200. In FIG. 13, the control unit 206 of the SNS server 200 determines whether the image file has been received from the imaging apparatus 100a via the communication unit 204 (step S301). When determining in step S301 that the image file has been received, the control unit 206 records the received image file in the database 202 (step S302).

The control unit 206 then determines whether information for specifying the image data of the connection partner (e.g., a file name of an original image file of the thumbnail image 406) and the position information of the connection side are recorded in the header information portion of the image file recorded in step S302 (step S303). When the control unit 206 determines in step S303 that the information for specifying the connection partner and the position information of the connection side are not recorded in the image file, the control unit returns the processing to step S301. In this case, the execution of the image joint is not instructed by the user, and hence only the processing to record the image file is performed.

When determining in step S303 that the information for specifying the connection partner and the position information of the connection side are recorded in the image file, the control unit 206 reads, from the database 202, the image file recorded in step S302 (step S304). At this time, not only the position information of the connection side but also information of a length or a pixel size may be used. Then, the image processing unit 206a of the control unit 206 performs combination processing (the image joint processing) to dispose the image data recorded in the read image file so that the image data is connected to the position of the connection side of the image data recorded in the image file of the connection partner recorded in the image file, thereby generating composite picture image data (step S305). During the above-mentioned composite picture confirmation display by the imaging apparatus 100a, thumbnail images are combined with each other, but in the image joint processing, the original images are combined with each other. After the image joint processing, the control unit 206 generates a composite picture image file based on this composite picture image data, and records the generated composite picture image file in the database 202 (step S306). The control unit 206 then returns the processing to step S301.

In the image combination, images having the same width do not necessarily need to be combined. Images having different widths may be arranged to produce such an effect that the images show a rhythmical impression when seen. There may be spaces between images. The spaces may be changed. Nevertheless, it is necessary to comprehend that a specified image responds and connects to another specified image.

Moreover, the same image may be connected to a plurality of images. Therefore, only connection information is beforehand held, and actually, it may be contrived that different images can be switched and displayed in accordance with conditions for seeing the images.

In this way, a plurality of users can prepare one composite picture. The function of the present embodiment may be incorporated in a camera. In the camera, there is a restriction on an image size as compared with an image size which can be handled on a cloud. Therefore, every time the composite picture can be prepared, the composite picture may be resized to a suitable size (e.g., a pixel number suitable for printing). In this case, the image to be subjected to a joint operation may be resized in accordance with a size of an image which is an object of the joint operation. Needless to say, the respective images may be held in separate files, and only when the images are displayed, the images may be suitably resized to a size suitable for the display, combined and displayed.

When determining in step S301 that the image file has not been received, the control unit 206 determines whether update of a Web page is requested, for example, from the imaging apparatus 100a (step S307). When determining in step S307 that the update of the Web page is requested, the control unit 206 sends Web page data to a device which makes the request, via the communication unit 204 (step S308). According to such processing, the images and composite picture images recorded in the database 202 of the SNS server 200 can be browsed, for example, in the imaging apparatus 100a. There is the possibility that this composite picture becomes a long and large band-like image when the number of users who perform the joint increases. In this case, there is the possibility that the composite picture overflows from the page, and hence, it may be intended that by the determination of a user operation, the image is displayed so that pages are turned over, or is displayed in a transition display manner as a moving image.

The control unit 206 then determines whether sending of size information and the thumbnail image is requested, for example, from the imaging apparatus 100a (step S309). When determining in step S309 that the sending of the size information and the thumbnail image is not requested, the control unit 206 returns the processing to step S301. When determining in step S309 that the sending of the size information and the thumbnail image is requested, the control unit 206 determines whether the image joint processing of the requested thumbnail image to the original image file has been permitted, i.e., whether the information regarding the permission of the image joint is recorded in the header information portion of this image file (step S310). When determining in step S310 that the image joint processing has not been permitted, the control unit 206 returns the processing to step S301. It is to be noted that in this case, a warning may be given to indicate that the image joint processing has not been permitted.

When determining in step S310 that the image joint processing has been permitted, the control unit 206 sends the size information and the thumbnail image via the communication unit 204 (step S311). The control unit 206 then returns the processing to step S301.

When determining in step S307 that the update of the Web page is not requested, the control unit 206 determines whether the comment has been input by the user (step S312). When determining in step S312 that the comment has not been input, the control unit 206 returns the processing to step S301. When determining in step S312 that the comment has been input, the control unit 206 records data of the input comment in the corresponding image file (step S313). The control unit 206 then returns the processing to step S301. Here, the comment data may be recorded in a file separate from the image file.

As described above, according to the present embodiment, the user of the imaging apparatus 100a can select a given side of an image uploaded onto a site managed by the SNS server 200, and connect an image photographed by the user to this selected side to prepare a composite picture. In this way, according to the present embodiment, the user can prepare a composite picture by a simple operation.

Figure 14A:
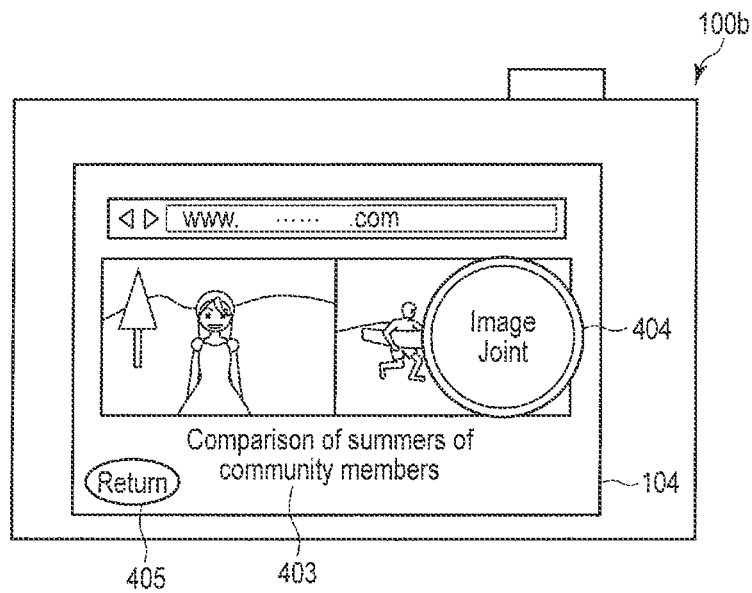
Figure 14B:
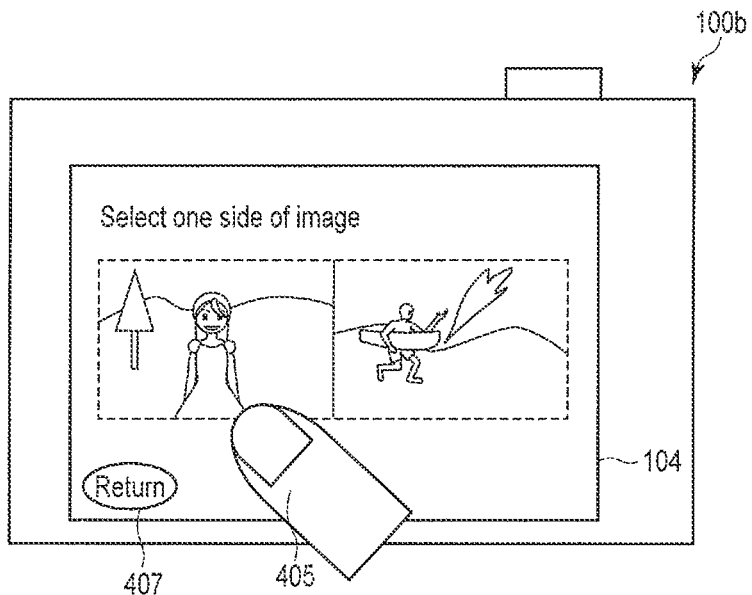

Moreover, as shown in FIG. 14A, the user of the imaging apparatus 100b who browses the composite picture prepared by the user of the imaging apparatus 100a can perform the image joint processing similarly to the user of the imaging apparatus 100a. When the user of the imaging apparatus 100b selects the image joint button 404 in a browser screen shown in FIG. 14A, such a connection side selection screen as shown in FIG. 14B is displayed. Then, when the connection side is selected, such divided through-image display as shown in FIG. 14C is performed. Here, the example of FIG. 14C shows an example where a lower side of the thumbnail image 406 is selected as a connection side. The example of FIG. 14C is an example where an already prepared composite picture image is to be connected to another image. The thumbnail image 406 in this case is a thumbnail image of the composite picture image prepared by combining two images. When the execution of photography is instructed by the user of the imaging apparatus 100b after the divided through-image display, such composite picture confirmation display as shown in FIG. 14D is performed. Afterward, composite picture image data is generated in the SNS server 200.

The above-mentioned processing is repeated among a plurality of users, whereby a composite picture image such as a picture scroll is prepared. In this composite picture image, intentions of the plurality of users are reflected, and hence it can be considered that the image does not easily become a monotonous image.

Moreover, in the present embodiment, the image data to be sent to the imaging apparatus 100a during the image joint processing is the thumbnail image data. The actual image file is not sent, so that the image uploaded onto the SNS server 200 cannot be shared by any user who does not intend to share the image.

Here, in the above-mentioned embodiment, the image data for generating the composite picture image data is acquired by the imaging apparatus 100a, and the actual composite picture image data is generated by the SNS server 200. In contrast, the imaging apparatus 100a may be provided with functions similar to those of the control unit 206 and the image processing unit 206a of the SNS server 200, so that the imaging apparatus 100a may perform processing up to the generation of the composite picture image data. Moreover, when the imaging apparatus 100a performs the processing up to the generation of the composite picture image data, the composite picture image may be generated based on image data acquired by communication of the imaging apparatus 100a with another imaging apparatus as an external apparatus of the imaging apparatus 100a. The composite picture image file does not have to be recorded in the server 200. The composite picture confirmation display has only to be performed.

Furthermore, in the present embodiment, an example of the selecting unit is the touch panel 112, but various operating units other than the touch panel 112 can be used as the selecting unit as long as the connection side can be specified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
a communication unit configured to acquire image data generated by a connection partner from an external apparatus of the imaging apparatus;
a display unit configured to display an image in accordance with the acquired image data of the connection partner;
a selecting unit configured to select, as a connection side, one of the sides of the image displayed on the display unit;
an imaging unit configured to image a subject to generate image data that is connected to the image data generated by the connection partner after the connection side is selected by the selecting unit; and
a control unit configured to record the image data generated by the imaging unit in a recording unit together with information indicating the position of the connection side.

2. The imaging apparatus according to claim 1,
wherein the communication unit sends the image data recorded in the recording unit and the information indicating the position of the connection side to the external apparatus in which the image data of the connection partner is recorded, and
the image data sent to the external apparatus is combined and connected to the position of the connection side of the image data regarding the connection partner, to generate a composite picture image.

3. The imaging apparatus according to claim 1, further comprising:
an image processing unit configured to perform image combination so that the image data generated by the imaging unit is connected to the position of the connection side of the image data regarding the connection partner, to generate the composite picture image.

4. The imaging apparatus according to claim 1,
wherein the display unit divides and displays the image based on the image data of the connection partner and a through-image based on image data for through-image display which is generated by repeatedly operating the imaging unit.

5. The imaging apparatus according to claim 1,
wherein the image data of the connection partner which is acquired in the communication unit is thumbnail image data.

6. An image communication method comprising:
acquiring image data generated by a connection partner from an external apparatus of an imaging apparatus;
displaying an image on a display unit in accordance with the acquired image data of the connection partner;
selecting one of the sides of the image displayed on the display unit, as a connection side, by a selecting unit;

imaging a subject after the connection side is selected, to generate image data that is connected to the image data generated by the connection partner.

* * * * *